P. L. WILLET.
SEED CLEANING MACHINE.
APPLICATION FILED APR. 14, 1911.
1,017,631.
Patented Feb. 13, 1912.
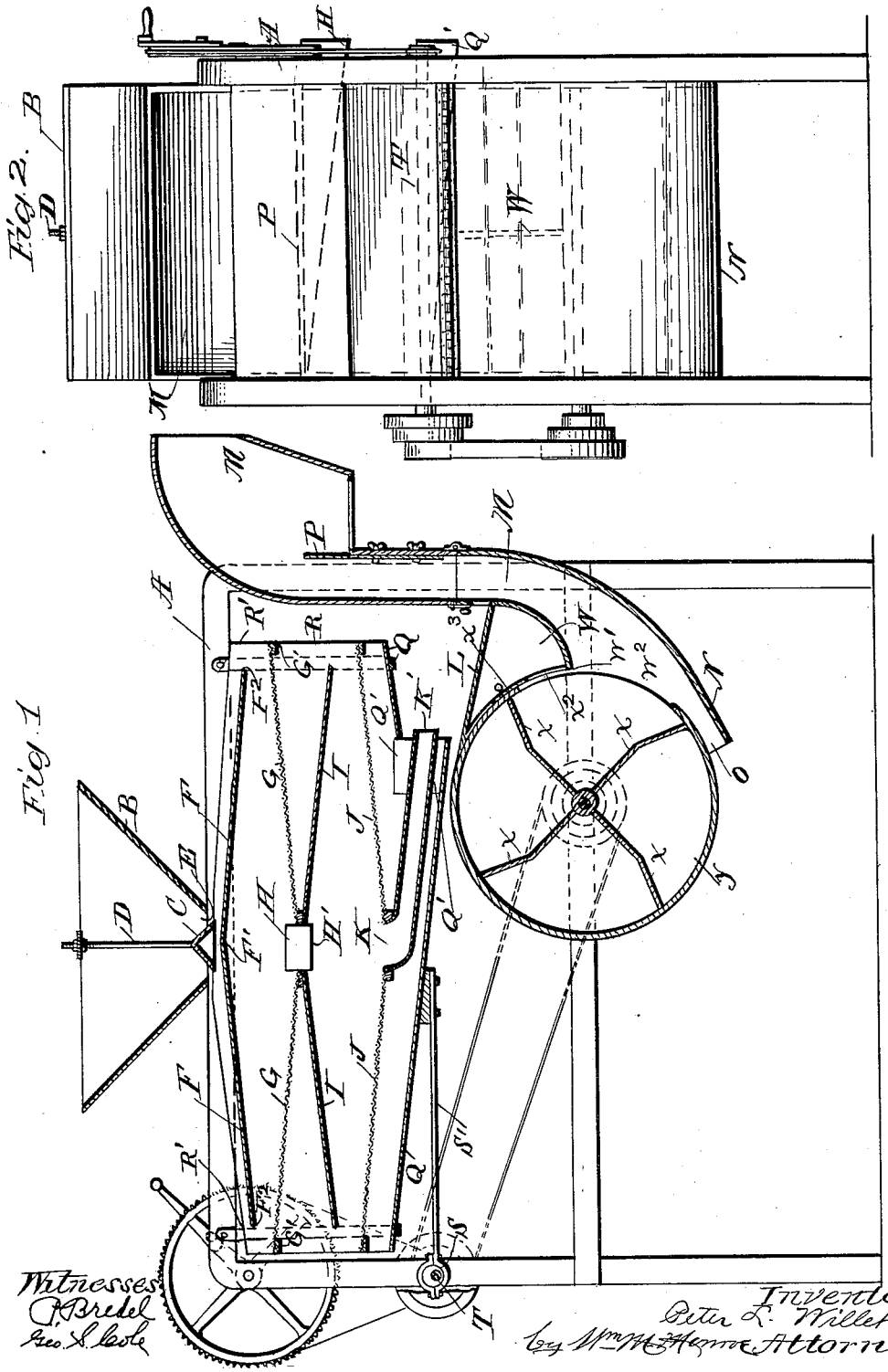

UNITED STATES PATENT OFFICE.

PETER L. WILLET, OF SHILOH, OHIO.

SEED-CLEANING MACHINE.

1,017,631.   Specification of Letters Patent.   Patented Feb. 13, 1912.

Application filed April 14, 1911. Serial No. 621,074.

*To all whom it may concern:*

Be it known that I, PETER L. WILLET, a citizen of the United States, and resident of Shiloh, in the county of Richland and State of Ohio, have invented certain new and useful Improvements in Seed-Cleaning Machines, of which I hereby declare the following to be a full, clear, and exact description, such as will enable others skilled in the art to which it appertains to make and use the same.

The objects of the invention are to provide a seed or grain cleaning device in which the grains are separated and widely distributed prior to screening, so that each seed will fall directly upon the face of each screen or riddle, and will be exposed to the full benefit thereof before being affected by the blast, whereby the cleansing process is thorough and complete and no accumulation of grain can occur upon any screen.

Heretofore the obstacles encountered in the structure and use of seed cleaners have been that the screens or riddles have been made long and the grain and chaff have been poured upon them without previous distribution, the ill effects of which have been to pass the grain and chaff over them to such a depth that the grain cannot all of it lie directly upon the screens, but will pass off only partially benefited thereby and greater reliance has been put upon the effect of the blast to free the grain from the chaff and lighter particles of grain or seed.

A further disadvantage in the use of the long screens has been found in the tendency of the grain to pile up at the lower ends of the screens owing to the vibration of the screens and a tendency to retrograde movement occasioned by the jerking movement of the screens.

To obviate these disadvantages and to provide a more efficient device of greater practicability and utility for general use the gravity operating machine herein described provides means for the preliminary distribution of the grain and chaff before screening to enable each grain to ride independently upon the surface of the screens and to traverse the entire length thereof.

The invention further comprises a duplicate arrangement of screens and distributing devices whereby the stream of material is divided and made to traverse a greatly extended surface and is capable of more complete and thorough treatment than if poured directly upon a single screen.

The invention further comprises the preliminary treatment of the grain and chaff with a coarse screen by means of which the grain is separated by gravity from the larger chaff particles, and following this treatment by the redistribution of the grain and the employment of a fine screen or riddle through which the dust or finer chaff will fall by gravity. All chaff and dust are carried off by gravity through suitable chutes or conductors to the side of the machine, and the treatment closes by blowing a draft through the grain thus cleansed so that any remaining dust or particles of chaff will be absolutely eliminated.

The invention also has reference to means for adjusting the mouth of the blast outlet passage to control the weight of the grain delivered therefrom, so that smaller grains of less specific gravity than the larger grains can be saved from the chaff if so desired.

The invention includes an inlet opening into the blower chamber arranged just above the upper wall of the blast passage and designed to prevent the back suction of the draft as the blades of the blower pass the blast opening. A partition transversely placed in the center of the inlet passage prevents an exterior draft from the wind from affecting the distribution of the blast and blowing through the machine.

The invention further comprises the combination and arrangement of parts and construction of details as hereinafter further described, shown in the accompanying drawings and specifically pointed out in the claims.

In the accompanying drawings Figure 1 is a vertical central section of the machine; Fig. 2 is an end elevation thereof.

In these views A is the frame or standard of the machine.

B is a hopper into which the grain and chaff are poured.

C is a deflecting member which may be prism shaped and is adjustably supported upon a rod D or other convenient holding means so that the area of the mouth E of the hopper can be controlled and the stream of grain and chaff will be uniformly deflected thereby in any thickness found to be best adapted for the distribution of the grain.

F is a distributing plate inclined in two directions from the center F' which is the highest point, and extends laterally to equal distances on each side. Upon this plate the grain slides by gravity in two equal portions and in a uniformly distributed condition and falls by gravity over the lower ends $F^2$, $F^2$, thereof upon the reversely inclined screen or riddle members G, G directly below the distributing plate and projecting beyond the edges thereof at F', G'.

The screen G is formed of coarse netting and the grain being of greater specific gravity will fall through it while the chaff and coarse particles will enter the opening H leading to an inclined chute H' and be transferred to the side of the machine. The grain will then fall upon the lower inclined redistributing plate or plates I, I similar to the one previously described, and will be redistributed for further treatment. After traversing the plate or plates I, I, the grain will fall upon the outer edges of the fine screen or riddle J through which the dust and fine particles of dirt will fall, and the cleansed grain will enter the central opening K and pass into a chute or conductor K' and fall upon an inclined plate L and thence will fall through the blast passage M onto a deflecting plate N and through an opening O in the wall of the blast passage and thence through the opening O' in the lower wall thereof into any convenient receptacle placed for it.

At P is shown a slidable partition or valve adapted to control the area of the blast outlet opening and by this means to control the character of the material delivered therefrom and to save lighter grain if desired, whose specific gravity is less than that of larger grains.

In action the heavy grains will follow the lower side of the passage M and the lighter grains and chaff will follow the upper side so that by raising the valve P it will enable the operator to catch the heavier grains passing through the passage M and they will fall back through the opening O. The dust falling through the screen or screens J, J is received upon the sheet metal plates Q, Q parallel therewith and transferred by gravity to the lateral chutes Q', Q'. To provide a vibrating movement of the distributing plates and screens they are mounted upon supports R or side plates mounted in turn on swinging rods R', R', and are connected with an eccentric S or crank by means of a connecting rod S' and hand or machine power can be applied to the operating shaft T upon which the eccentric is mounted.

$x$, $x$ are the blower blades, $y$ the blower chamber.

To insure the equalizing of the draft and to prevent the blades of the blower from causing a back draft or suction through the outlet or blast opening M as they pass the upper edge of the outlet opening $W^2$ an air inlet opening $X^2$ is preferably located in the wall of the blower chamber $y$ just above the outlet opening and in close proximity thereto, so that as the blades revolve the suction will be immediately broken by inrushing air the moment the blades pass the point W'. In this manner greater efficiency and more uniform distribution of the draft through the blast outlet M is obtained. The opening $X^2$ is controlled by a slide $X^3$. A partition $W^3$ centrally placed in the transverse air inlet passage V prevents gusts of wind from blowing through the machine and interfering with the draft.

I am aware that heretofore deflecting plates have been employed in machines of this character to conduct the grain to the screens, but have not been so constructed as to receive the grain at one end and permit it to scatter so as to separate the individual grains and particles from each other before delivering them upon the screens.

Having described the invention what I claim as new and desire to secure by Letters Patent is:

1. In a grain cleaner, the combination with a chute, and a deflecting member thereon, of reversely inclined distributing plates underneath said deflecting member, reversely inclined screens extending beyond said distributing plates and arranged to receive the material therefrom in a distributed state, a common discharge pipe adapted to receive chaff from said screens, reversely inclined plates adapted to redistribute said material and reversely inclined finer screens adapted to receive the redistributed material, a common outlet chute for said last mentioned screens, and reversely inclined plates adapted to receive the screened material from said finer screens, common supports for said screens and plates and means for vibrating said supports to urge the particles of seed and chaff alternately from the plates and sieves at right angles to their edges.

2. In a seed cleaner, in combination, a chute for delivering grains, reversely inclined distributing plates having their angle of junction underneath said chute, reversely inclined screens adapted to receive on their upper ends the distributed material from the lower ends of said distributing plates, similar reversely inclined redistributing plates, underneath said screens, finer screens adapted to receive the redistributed material, reversely inclined plates adapted to receive the sifted grain from the finer screens, a chute adapted to receive the chaff from the coarser screens, a chute adapted to receive the chaff from the finer screens and a chute adapted to receive the screened seed and dust and means for giving vibrating movement to said screens at right angles to their edges.

3. In a grain cleaner, in combination, a chute for delivering mixed dust, grain, and chaff, reversely inclined distributing plates for grain and chaff, having their angle of junction underneath said chute, reversely inclined coarse screens adapted to receive the distributed material on their upper ends as it passes from the lower ends of said distributing plates, said screens adapted to pass the grain and finer material through their meshes, and to convey the chaff to a central opening, a series of reversely inclined redistributing plates adapted to receive the grain and finer material as it passes through said sieves, and to retain the grain while passing the dust through their meshes, a second series of reversely inclined redistributing plates, a final series of reversely inclined sieves adapted to discharge the dust therethrough and to retain the seed, reversely inclined surfaces adapted to convey away the dust, a chute therefor, and a chute for the sieved seed, swinging side boards to which said plates and sieves are attached, and means for vibrating said plates and screens in a direction at right angles to the edges, whereby the particles are alternately given a downward impetus upon reversed screens and plates to distribute the same and to provide a constant flow of the particles of chaff and seed therefrom and a continuous flow of cleaned grain from the lower edges thereof.

In testimony whereof, I hereunto set my hand this 29" day of March 1911.

PETER L. WILLET.

In presence of—
WM. M. MONROE,
GEO. S. COLE.

---

Copies of this patent may be obtained for five cents each, by addressing the "Commissioner of Patents, Washington, D. C."